US011574024B2

(12) United States Patent
Pelleg et al.

(10) Patent No.: US 11,574,024 B2
(45) Date of Patent: Feb. 7, 2023

(54) METHOD AND SYSTEM FOR CONTENT BIAS DETECTION

(71) Applicant: YAHOO ASSETS LLC, Dulles, VA (US)

(72) Inventors: Dan Pelleg, Haifa (IL); Avihai Mejer, Atlit (IL); Ali Tabaja, Haifa (IL)

(73) Assignee: YAHOO ASSETS LLC, Dulles, VA (US)

( * ) Notice: Subject to any disclaimer, the term of this patent is extended or adjusted under 35 U.S.C. 154(b) by 144 days.

(21) Appl. No.: 16/426,138

(22) Filed: May 30, 2019

(65) Prior Publication Data

US 2020/0380049 A1 Dec. 3, 2020

(51) Int. Cl.
*G06F 16/00* (2019.01)
*G06F 16/951* (2019.01)
*G06Q 30/02* (2012.01)
*G06F 16/332* (2019.01)

(52) U.S. Cl.
CPC .......... *G06F 16/951* (2019.01); *G06F 16/332* (2019.01); *G06Q 30/0256* (2013.01); *G06Q 30/0282* (2013.01)

(58) Field of Classification Search
CPC ...... G06F 16/35; G06F 16/951; G06F 16/332; G06Q 30/0256; G06Q 30/0282
See application file for complete search history.

(56) References Cited

U.S. PATENT DOCUMENTS

| | | | |
|---|---|---|---|
| 8,082,288 B1* | 12/2011 | Yeh ....................... | G06F 16/951 709/200 |
| 9,860,337 B1* | 1/2018 | Brown .................... | G06F 40/30 |
| 2007/0162432 A1* | 7/2007 | Armstrong .......... | G06F 16/9535 |
| 2008/0154883 A1* | 6/2008 | Chowdhury .......... | G06F 40/258 |
| 2014/0156571 A1* | 6/2014 | Hennig .................. | G06N 7/005 706/12 |
| 2014/0330760 A1* | 11/2014 | Meier .................... | G06N 20/00 706/12 |

\* cited by examiner

*Primary Examiner* — Jared M Bibbee
(74) *Attorney, Agent, or Firm* — Venable LLP

(57) ABSTRACT

The present teaching relates to a method, system, and programming for providing content. A plurality of content items and publication information related thereto are obtained. For each of the plurality of content items, one or more topics are determined in accordance with a model. The related publication information associated with each content item is analyzed to identify at least one source of a plurality of sources that published the content item. A distribution is generated of each of the plurality of content items with respect to the plurality of sources and the one or more topics of the content item, and a bias of a source with respect to publishing content is identified based on the distributions of the plurality of content items.

21 Claims, 13 Drawing Sheets

METHOD AND SYSTEM FOR CONTENT BIAS DETECTION

BACKGROUND

1. Technical Field

The present teaching generally relates to data processing. More specifically, the present teaching relates to identifying content sources that are consistently biased regarding certain content topics and identifying content topics which certain content sources avoid covering.

2. Technical Background

The Internet has made it possible for a person to electronically access virtually any content at any time and from any location. The Internet technology facilitates information publishing, information sharing, and data exchange in various spaces and among different persons. Typically, users issue a search query to a search engine to obtain desirable content. A search engine is one type of information retrieval system that is designed to help users search for and obtain access to information that is stored in a computer system or across a network of computers. In response to a query from a user, the search engine can search different content providers online to obtain search results matching the query. Content providers can be a publisher, a content portal, or any other sources from which content can be obtained.

Typically, content providers implement a process of selecting, and then filtering content items that can be consumed by audiences. For example, in a news medium, an editor plays the role of a gatekeeper. That is, the editor's role is to decide what kind of news items will be published and which news items will be dropped. The news channel may receive various news items from all over the world. The channel may have its own set of ethics, policies, and biases through which the editor decides the news items that will be published, aired, or dropped. In some cases, certain news items are rejected by the editor due the organizations policy or the news items which are not suitable for publishing.

The type of content consumed by the audiences can have a profound influence on their preferences. For example, in a media-related debate, people tend to support one side or the other depending on the type of content consumed. The same news item coming from different sources can be presented in different ways and trigger audiences preconceived notions about the agenda of a particular content source (e.g., news organization).

Accordingly, there is a requirement for providing audiences with additional information that identifies content sources that are biased regarding certain content topics and identifying content topics which certain content sources avoid covering.

SUMMARY

The teachings disclosed herein relate to methods, systems, and programming for providing content.

One aspect of the present disclosure provides for a method, implemented on a machine having at least one processor, storage, and a communication platform capable of connecting to a network for providing content. The method comprises the steps of: obtaining a plurality of content items and publication information related thereto, determining, in accordance with a model, one or more topics of each of the plurality of content items, analyzing the related publication information associated with each content item to identify at least one source of a plurality of sources that published the content item, generating a distribution of each of the plurality of content items with respect to the plurality of sources and the one or more topics of the content item, and identifying, based on the distributions of the plurality of content items, a bias of a source with respect to publishing content.

By one aspect of the present disclosure, there is provided a system for providing content. The system comprises a content retrieval unit configured for obtaining a plurality of content items and publication information related thereto, a topic determining unit configured for determining, in accordance with a model, one or more topics of each of the plurality of content items, a content processing unit configured for analyzing the related publication information associated with each content item to identify at least one source of a plurality of sources that published the content item, a clustering unit configured for generating a distribution of each of the plurality of content items with respect to the plurality of sources and the one or more topics of the content item, and a bias determining unit configured for identifying, based on the distributions of the plurality of content items, a bias of a source with respect to publishing content.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a machine readable and non-transitory medium having information recorded thereon for providing content, wherein the information, when read by the machine, causes the machine to perform: obtaining a plurality of content items and publication information related thereto, determining, in accordance with a model, one or more topics of each of the plurality of content items, analyzing the related publication information associated with each content item to identify at least one source of a plurality of sources that published the content item, generating a distribution of each of the plurality of content items with respect to the plurality of sources and the one or more topics of the content item, and identifying, based on the distributions of the plurality of content items, a bias of a source with respect to publishing content.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
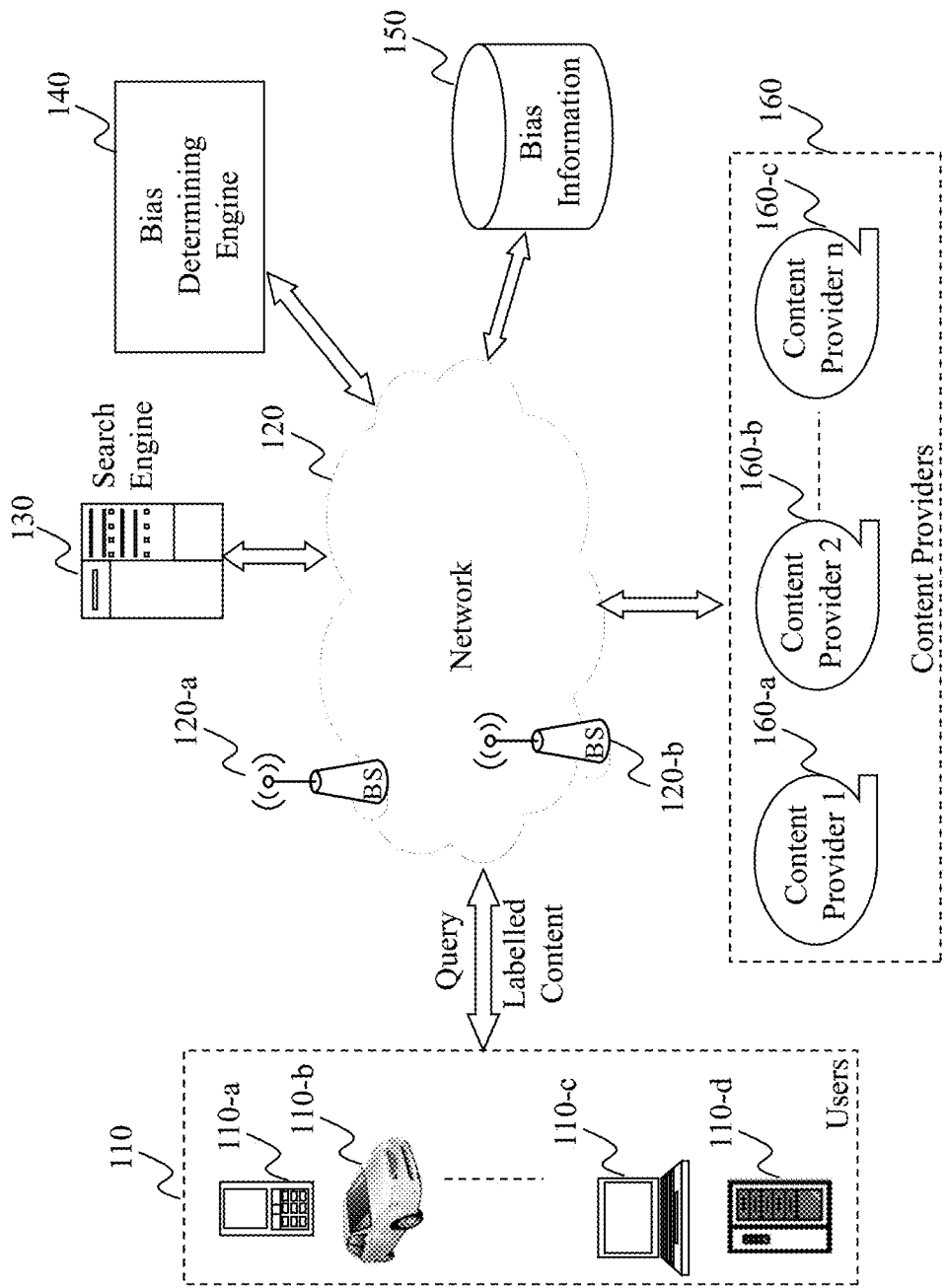
FIG. 1 illustrates an exemplary system configuration in which a bias determining engine can be deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 illustrates an exemplary system configuration in which a bias determining engine 140 can be deployed in accordance with various embodiments of the present teaching. In FIG. 1, the exemplary system 100 includes users 110, a network 120, a search engine 130, the bias determining engine 140, a bias information database 150, and one or more content providers 160, including content provider 1 160-a, content provider 2 160-b, . . . , content provider n 160-c.

The network 120 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 120-a, . . . , 120-b, through which a data source may connect to the network 120 in order to transmit information via the network and a network node may connect to the network 120 in order to receive information. In one embodiment, the network 120 may be a content distribution network, which connects users 110 to the search engine 130, which provides the users with relevant content obtained from the content providers 160.

Users 110 may be of different types such as users connected to the network via desktop connections (110-d), users connecting to the network 120 via wireless connections such as through a laptop (110-*c*), a handheld device (110-*a*), or a built-in device in a mobile vehicle such as a motor vehicle (110-*b*). In one embodiment, user(s) 110 may be connected to the network 120 and be able to access and interact with online content (provided by the content providers 160), via wired or wireless means, through related operating systems and/or interfaces implemented within user-wearable devices (e.g., glasses, wrist watch, etc.). A user, e.g., 110-*a*, may send a request or a search query for content to the search engine 130 and receive content and additional information related to the content (identified by the bias determining engine 140) via the network 120. For instance, by one embodiment of the present disclosure, the user may receive a content item in response to the query. The content item may be labelled with a tag indicating a bias of the content source from which the content item was retrieved.

Content providers 160, may correspond to an entity, whether an individual, a firm, or an organization, publishing or supplying content, including a blogger, television station, a newspaper issuer, a web page host, a content portal, an online service provider, or a game server. For example, in connection to an online or mobile ad network, content provider 130 may be an organization such as CNN.com, a content portal such as YouTube and Yahoo.com, or a content-soliciting/feeding source such as Twitter or blogs.

In operation, the user issues a search query, which is transmitted to the search engine 130 via the network 120. In response to receiving the search query, the search engine 130 searches different content providers i.e., content provider 1 160-*a*, content provider 2 160-*b*, . . . , content provider n 160-*c* to obtain relevant content items (i.e., a search result) matching the query. The search engine 130 may be configured to label each piece of content item provided to the user with information related to a bias of the content source from which the content item is obtained. The search engine 130 may retrieve the relevant bias information from the bias information database 150 and present the search result(s) to the user.

The bias determining engine 140 is configured to obtain the content items from the content providers 160 and identify at least one type of bias associated with the content source (i.e., publisher, portal etc.,) from which the content item is obtained. The bias information of the plurality of sources is stored in the bias information database 150. The search engine may access the stored bias information to label the corresponding content item with information related to the bias of the source from which the content item was obtained.

By one embodiment, the bias determining engine 140 is configured to determine a coverage bias of a source with respect to a topic. The coverage bias may be determined based on a number of content items of the topic published by the source. In this manner, the bias determining engine 140 can identify whether a particular source completely avoids covering a certain topic. Additionally, the bias determining engine 140 may also be configured to determine a sentiment bias (of the content source) with respect to a certain topic. The sentiment based bias corresponds to a manner in which content items of the certain topic are published by the content source. Specifically, the bias determining engine 140 may be configured to identify whether a particular topic is covered by the source in a positive manner (i.e., positive sentiments), a negative manner (i.e., negative sentiments) or in a neutral manner. Details regarding the operation of the bias determining engine are described later with reference to at least FIGS. 4, 6, and 9.

Figure 2:
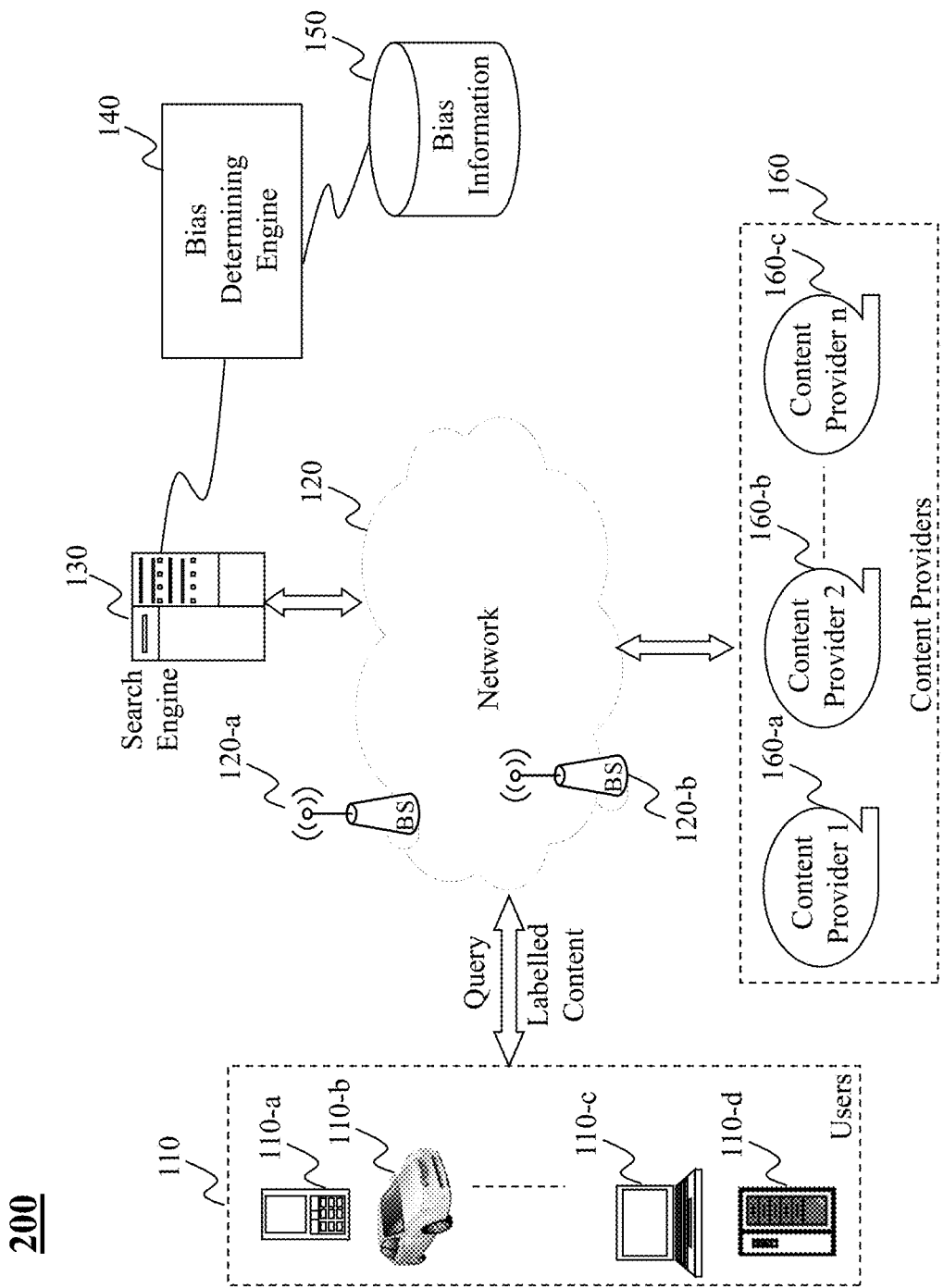
FIG. 2 illustrates another exemplary system configuration in which a bias determining engine can be deployed, according to an embodiment of the present teaching.

In the embodiment illustrated in FIG. 1, the bias determining engine 140 is a stand-alone service, and may provide its services to a plurality of search engines (not shown) and users. In FIG. 2, an alternative configuration 200 is provided, in which the bias determining engine 140 is connected to the search engine 130 as its backend service engine. That is, in this embodiment, the bias determining engine 140 is a special module in the backend of the search engine 130. When there are multiple search engines (not shown), each may have its own backend module for content bias determination.

Figure 3:
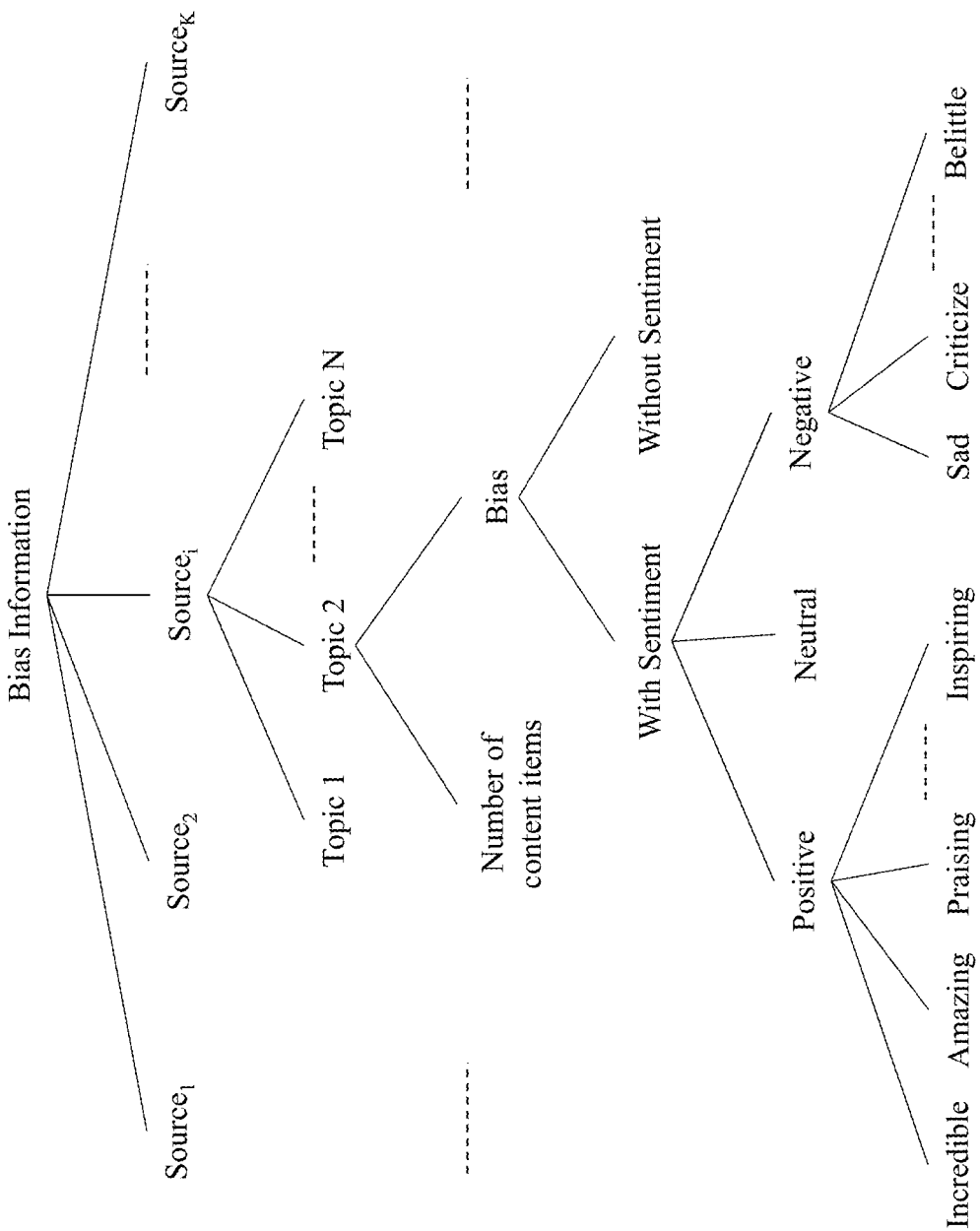
FIG. 3 depicts bias information, in accordance with an embodiment of the present teaching.

FIG. 3 depicts bias information, in accordance with an embodiment of the present teaching. Specifically, FIG. 3 depicts bias information determined by the bias determining engine 140 and stored in the bias information database 150. As shown in FIG. 3, the bias determining engine 140 identifies bias information for a plurality of content sources. For each content source, the bias determining engine 140 identifies a plurality of topics covered by the content source. For each topic, the bias determining engine 140 maintains a number of content items related to the topic that are published by the content source, and bias information associated with the topic.

By one embodiment, the bias determining engine 140 determines two types of biases: a first bias (referred to herein as a coverage bias) and a second bias (referred to herein as a sentiment based bias). The coverage bias of a source with respect to a topic is determined based on a number of content items of the topic published by the source. The coverage bias is determined without extracting information related to sentiment features included in the content items. In contrast, the sentiment based bias of a source with respect to a topic is determined based on sentiment features (such as positive sentiments, negative sentiments, and neutral sentiments) extracted from each content item of the topic that is published by the source. As is described later with reference to FIG. 9, the bias determining engine 140 of the present teaching is trained to extract positive sentiments such as incredible, amazing, praising, inspiring etc., and negative sentiments such as sad, criticize, belittle, etc., from the content items published by the source in order to determine an overall sentiment of the source with respect to the topic.

Figure 4:
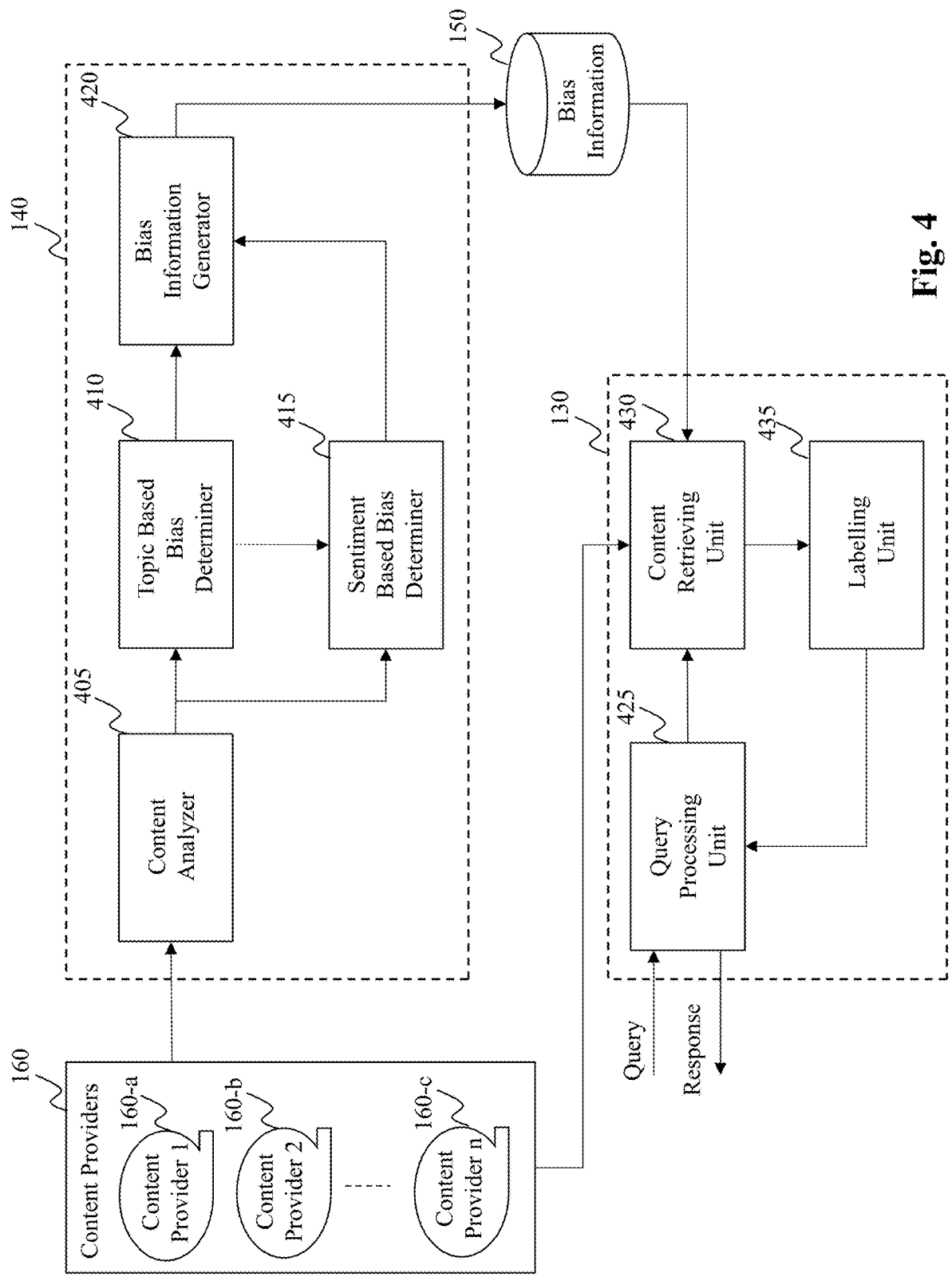
FIG. 4 depicts an exemplary high-level system diagram illustrating interactions between content providers, a search engine, and a bias determining engine, according to an embodiment of the present teaching.

Turning now to FIG. 4, there is depicted an exemplary high-level system diagram illustrating interactions between content providers 160, a search engine 130, and a bias determining engine 140, according to an embodiment of the present teaching. By one embodiment, the bias determining engine 140 includes a content analyzer 405, a topic based bias determiner 410, a sentiment based bias determiner 415, and a bias information generator 420. The search engine 130 includes a query processing unit 425, a content retrieving unit 430, and a labelling unit 435.

The content analyzer 405 of the bias determining engine 140 retrieves content items from the content providers 160 including content provider 1 160-*a*, content provider 2 160-*b*, . . . , content provider n 160-*c* and analyzes each content item. For example, the content analyzer 405 may be configured to analyze metadata associated with each content item. The metadata may include information pertaining to a geolocation of a source where the content item is obtained from, a time of content creation, a format of the content item, a type of content included in the content item etc.

The analyzed content items are further processed by the topic based bias determiner 410 and the sentiment based bias determiner 415 in order to identify the coverage bias (i.e., topic based bias) and sentiment based bias, respectively. Details regarding the operations of the topic based bias determiner 410 and the sentiment based bias determiner 415 are described later with reference to FIGS. 6 and 9, respectively. Further, the bias information generator 420 utilizes the bias information (determined by the topic based bias determiner 410 and the sentiment based bias determiner 415) to generate and store bias information (e.g., bias information records) in the bias information database 150, with respect to the plurality of content sources.

The query processing unit 425 included in the search engine 130 receives a query issued by a user. The query may include keywords (entered by the user) related to content items that the user wishes to obtain. The query processing unit 425, in response to receiving the search query, may process for example, the keywords included in the query and instruct the content retrieving unit 430 to retrieve relevant content items from different content providers (i.e., content provider 1 160-a, content provider 2 160-b, . . . , content provider n 160-c).

Additionally, the content retrieving unit 430 obtains from the bias information database 150, bias information corresponding to the retrieved content items. For example, the bias information may correspond to coverage bias (and/or sentiment bias) associated with the content sources from which the content items are retrieved. By one embodiment, the labelling unit 435 labels each content item with the corresponding bias information and transmits the labelled content items to the query processing unit. The query processing unit 425 further transmits the labelled content items to the user in response to the received query.

Figures 5A, 5B:
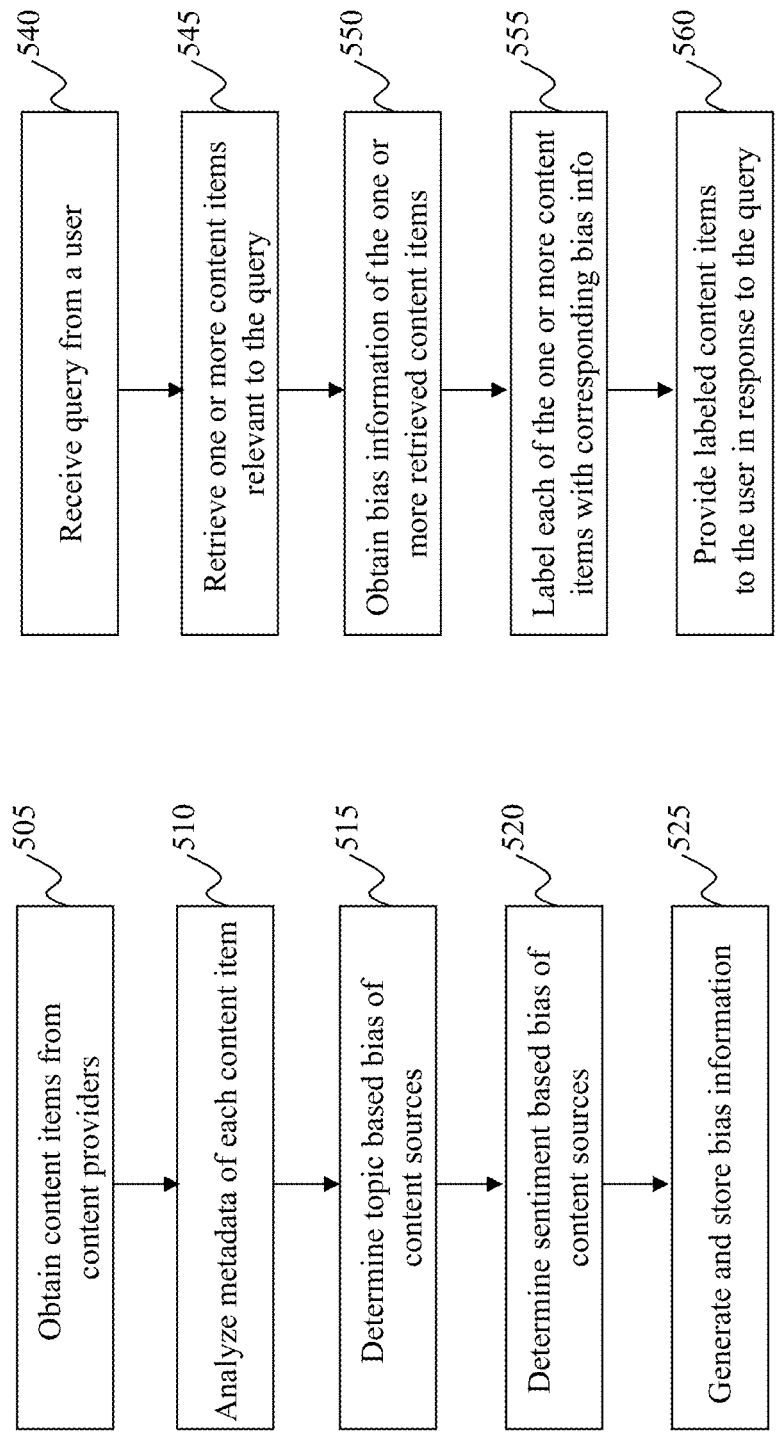
FIG. 5A is a flowchart of an exemplary process performed by a bias determining engine, according to some embodiments of the present teaching.
FIG. 5B is a flowchart of an exemplary process performed by a search engine, according to some embodiments of the present teaching.

FIG. 5A is a flowchart of an exemplary process performed by a bias determining engine, according to some embodiments of the present teaching. The process commences in step 505 wherein the bias determining engine obtains content items from content providers. In step 510, metadata associated with each of the obtained content items is analyzed. The analyzed content items are processed by the topic based bias determining unit and the sentiment based bias determining unit of the bias determining engine. The process in step 515 determines a topic based bias of content sources from which the content items are obtained. The process in step 520, determines a sentiment based bias of content sources from which the content items are obtained. Further, in step 525, the process generates records of the determined bias information and stores the generated bias information in a bias information database.

FIG. 5B is a flowchart of an exemplary process performed by a search engine, according to some embodiments of the present teaching. The process commences in step 540, wherein a query is received from a user. In step 545, the search engine retrieves one or more content items relevant to the query. The process then moves to step 550, wherein the search engine retrieves bias information associated with the retrieved content items. For example, the bias information may correspond to a coverage bias and/or sentiment based bias of the content sources from which the content items are retrieved. In step 555, each of the content items is labeled with the corresponding bias information. In step 560, the labeled content items are provided to the user in response to the query.

Figure 6:
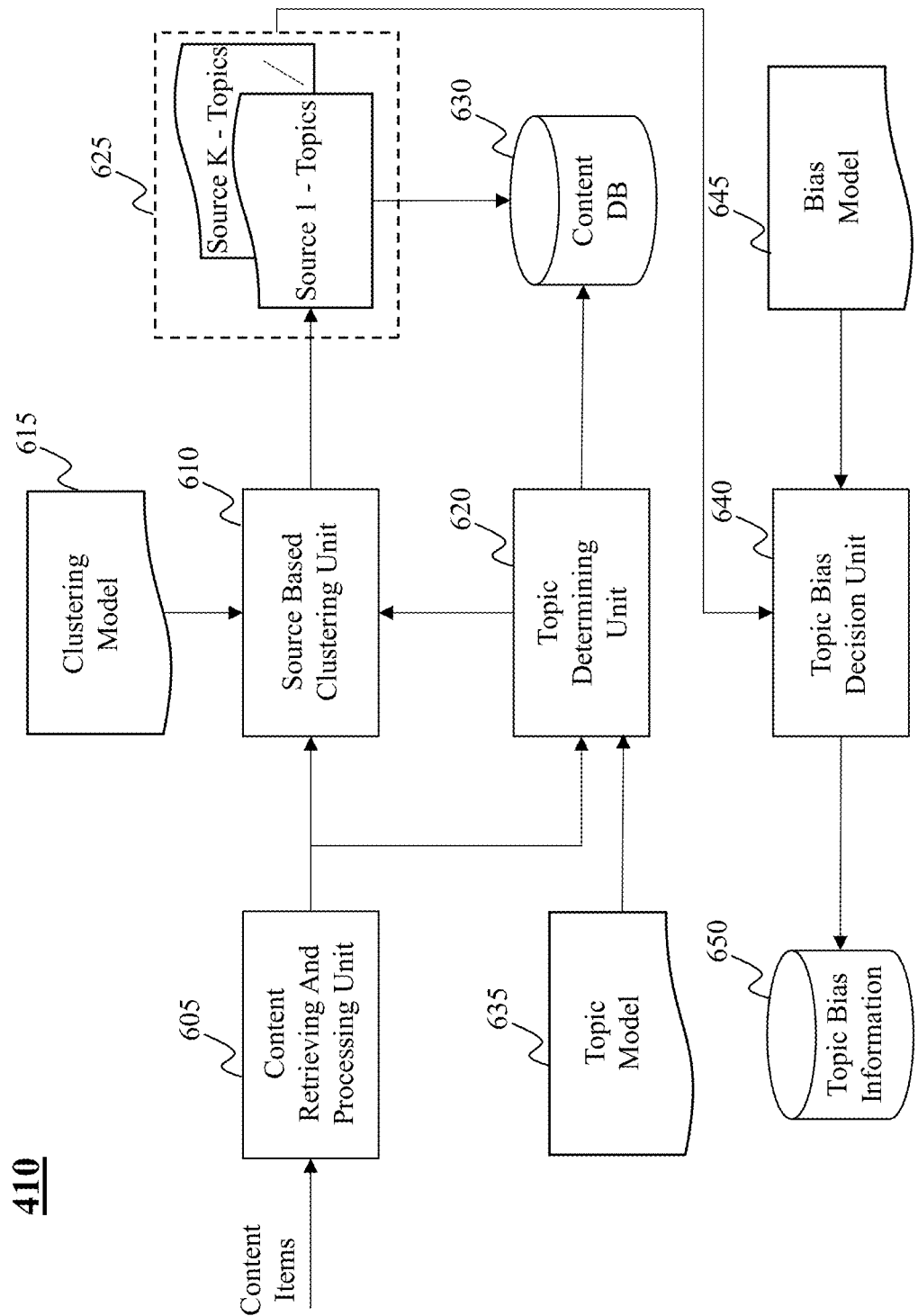
FIG. 6 depicts an exemplary high-level system diagram of a topic based bias determiner included in a bias determining engine, according to an embodiment of the present teaching.

Turning now to FIG. 6, there is depicted an exemplary high-level system diagram of a topic based bias determiner 410 included in a bias determining engine 140, according to an embodiment of the present teaching. The topic based bias determiner 410 includes a content retrieving and processing unit 605, a source based clustering unit 610, a topic determining unit 620, and a topic bias decision unit 640.

The content retrieving and processing unit 605 obtains a plurality of content items and processes each content item to extract publication information related thereto. Specifically, the content retrieving and processing unit 605 analyzes the related publication information associated with each content item to identify at least one source of a plurality of sources that published the content item. The topic determining unit 620 is configured to process each content item and determine, in accordance with a topic model 635, one or more topics of each of the plurality of content items. It must be appreciated that a topic of a content item corresponds to a theme that characterizes the overall content included in the content item. Each content item and its associated one or more topics are stored in a content database 630.

Figure 8:
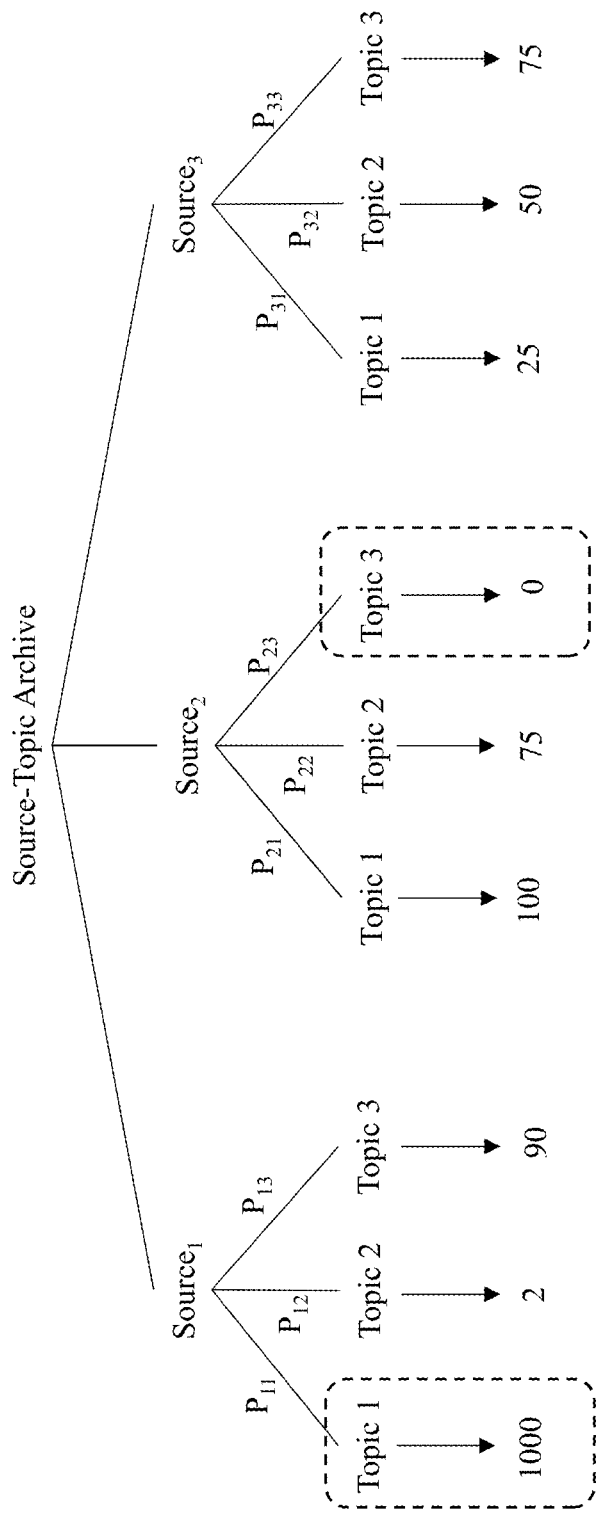
FIG. 8 is a schematic illustrating a source-topic archive used for determining a topic based bias of a plurality of sources, according to an embodiment of the present teaching.

The identified at least one source of a plurality of sources that published a content item, and the one or more topics determined to be associated with the content item are utilized by the source based clustering unit 610 to generate a source-topic archive 625. Specifically, by one embodiment, the source based clustering unit 610 utilizes a clustering model 615 to generate a distribution of each of the plurality of content items with respect to the plurality of sources and the one or more topics of the content item. An exemplary illustration of a source-topic archive generated by the topic based bias determiner 410 is illustrated in FIG. 8.

The topic bias decision unit 640 is configured to identify, in accordance with a bias model 645, whether each source has a bias with respect to publishing content based on the generated source-topic archive. Details pertaining to the different mechanisms utilized by the topic bias decision unit 640 in identifying whether a particular source has a bias with respect to publishing content of a certain topic are described later with reference to FIG. 8. Further, the topic bias decision unit 640 stores the identified topic based biases for the plurality of sources along with the generated source-topic archive 625 in a topic bias information database 650.

Figure 7:
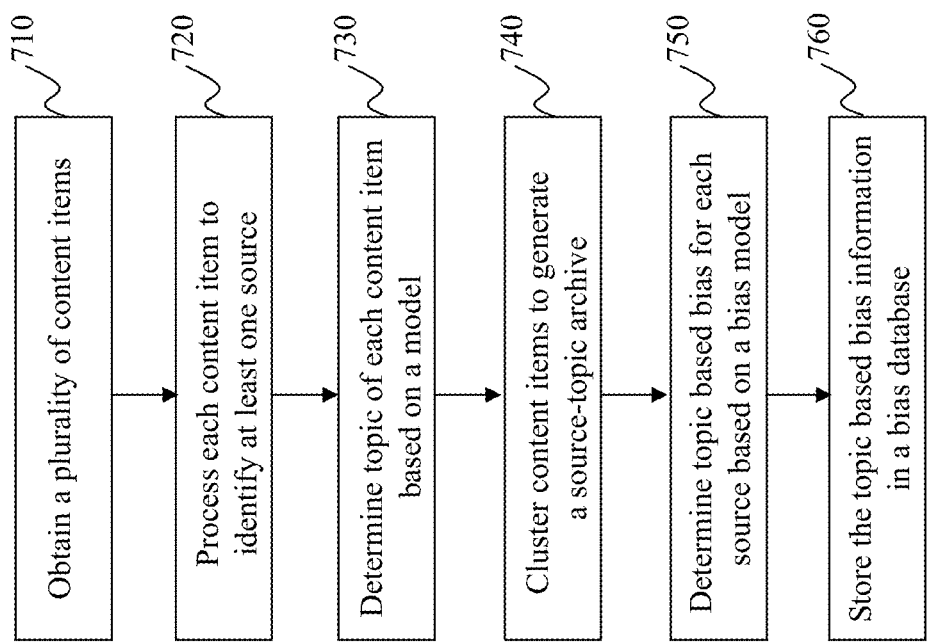
FIG. 7 is a flowchart of an exemplary process performed by a topic based bias determiner, according to some embodiments of the present teaching.

FIG. 7 depicts a flowchart of an exemplary process performed by a topic based bias determiner, according to some embodiments of the present teaching. The process commences in step 710, wherein the topic based bias determiner obtains a plurality of content items. In step 720, the topic based bias determiner analyzes meta-information (e.g., publication information) associated with each content item to identify at least one source that published the content item.

In step 730, a topic determining unit included in the topic based bias determiner, determines, in accordance with a topic model, at least one topic of each of the plurality of content items. In step 740, the topic based bias determiner clusters the content items with respect to the plurality of sources and the one or more topics of the content item. In other words, the topic based bias determiner generates a source-topic archive as depicted in FIG. 8. Further, in step 750, the topic based bias determiner identifies a topic based bias for each source based on a bias model. The identified bias information along with the generated source-topic archive are stored in a bias information database in step 760.

FIG. 8 is a schematic illustrating a source-topic archive used for determining a topic based bias of a plurality of sources, according to an embodiment of the present teaching. For sake of simplicity, FIG. 8 illustrates the source-topic archive for three sources ($Source_1$, $Source_2$, and $Source_3$) and three topics ($Topic_1$, $Topic_2$, and $Topic_3$). The integers depicted under each topic correspond to a number of content items of the topic published by the corresponding source. For example, $Source_1$ publishes a total of 1000 content items of $Topic_1$, 2 content items of $Topic_2$ and 90 content items of Topic$_3$. Similarly, Source$_2$ publishes a total of 100 content items of Topic$_1$, 75 content items of Topic$_2$ and no content items of Topic$_3$, and Source$_3$ publishes 25 content items of Topic$_1$, 50 content items of Topic$_2$, and 75 content items of Topic$_3$.

Upon generating the source-topic archive, the topic bias decision unit 640 included in the topic based bias determiner 410, utilizes the bias model 645 to determine a coverage bias (i.e., a topic based bias) for the plurality of sources. For instance, referring to FIG. 8, the topic bias decision unit 640 may identify that Source$_2$ has a coverage bias with respect to Topic$_3$ as Source$_2$ completely avoids covering i.e., publishing content items of Topic$_3$.

Additionally, by one embodiment, a source may be deemed to have a coverage bias with respect to a topic, if the source publishes substantially less (or alternatively, substantially more) number of content items of the topic with respect to content items of the topic published by other sources. For example, referring to FIG. 8, it can be observed that with regard to Topic$_2$, Source$_1$ publishes 2 content items, whereas Source$_2$ and Source$_3$ respectively publish 75 and 50 content items. Accordingly, the topic bias decision unit may identify Source$_1$ to have a coverage bias with respect to Topic$_2$, as it publishes substantially fewer content items of the topic as compared to other sources. In a similar manner, Source$_1$ may be deemed to have a coverage bias with regard to Topic$_1$ as it publishes substantially a greater number of content items (e.g., 1000 content items) as compared to the number of content items of Topic$_1$ published by Source$_2$ and Source$_3$ (i.e., 100 and 25 content items, respectively).

By one embodiment, the topic bias decision unit 640 may compare the number of content items of a topic published by a source to an average number of content items of the topic published by other sources. Based on a difference between the number of content items of the topic published by the source and the average number of content items of the topic published by other sources being above a predetermined threshold, the bias decision unit may be configured to identify the source to have a coverage bias with respect to the topic.

By one embodiment of the present disclosure, the topic bias decision unit 640 may identify coverage bias of a source with respect to a topic based on a biasing function (B). The function B may incorporate the following two parameters: Count$_{i,j}$ and P$_{i,j}$. The parameter Count$_{i,j}$ corresponds to a number of content items of topic j currently published by Source i. The parameter P$_{i,j}$ corresponds to a probability of Source i publishing content items of Topic j. In other words, the parameter P$_{i,j}$ corresponds to an expectation of Source i to publish content items of Topic j. It must be appreciated that P$_{i,j}$ may be computed based on prior publishing information of Source i within a predetermined time period. Accordingly, in this embodiment, a source is identified to have a coverage bias with respect to a topic based on both, the count parameter and the probability parameter. For example, referring to FIG. 8 with regard to Source$_2$, only if P$_{23}$ is greater than zero i.e., Source$_2$ is expected to publish content items of Topic$_3$ and the Count$_{2,3}$ being zero, the bias decision unit may identify Source$_2$ to have a coverage bias with respect to Topic$_3$.

Figure 9:
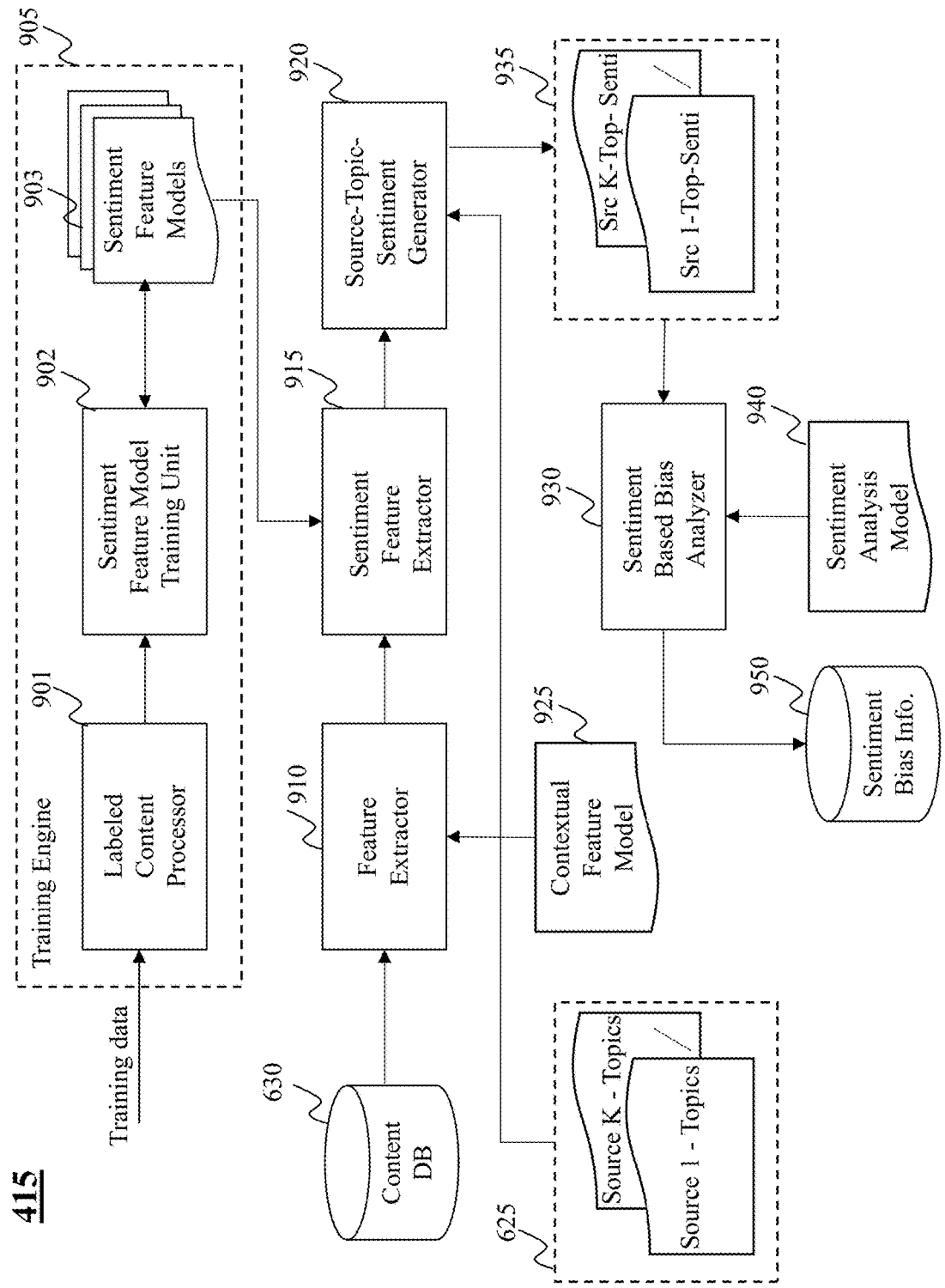
FIG. 9 depicts an exemplary high level system diagram of a sentiment based bias determiner included in a bias determining engine, according to an embodiment of the present teaching.

FIG. 9 depicts an exemplary high-level system diagram of a sentiment based bias determiner 415 included in a bias determining engine 140, according to an embodiment of the present teaching. In this illustrated embodiment, the sentiment based bias determiner 415 includes a training engine 905 for generating sentiment feature models 903 to be used for extracting sentiment features from content items. In what follows, there is first provided a description of the operation of the training engine 905 followed by a description of the operation of the sentiment based bias determiner.

Figure 10:
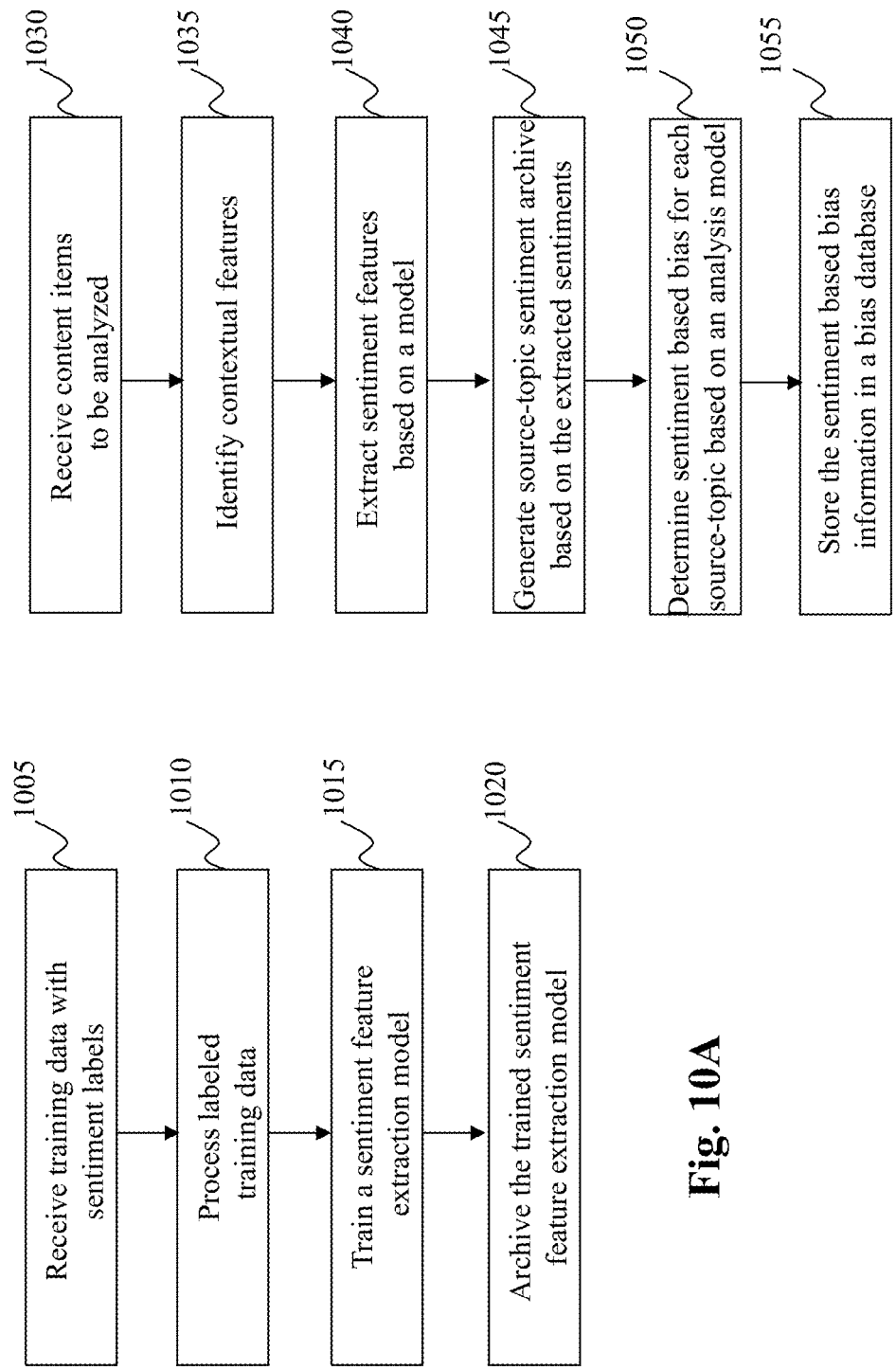
FIG. 10A is a flowchart of an exemplary process for training a sentiment feature extraction model via machine learning, according to an embodiment of the present teaching.
FIG. 10B is a flowchart of an exemplary process performed by a sentiment based bias determiner, according to some embodiments of the present teaching.

For generating the sentiment feature models 903, the training engine 905 may correspond to an offline mechanism which comprises a labeled content processor 901, a sentiment feature model training unit 902, and sentiment feature models 903. FIG. 10A is a flowchart of an exemplary process for generating sentiment feature models 903. In operation, this offline portion receives, at step 1005, training data (labeled with sentiment features) and processes, at step 1010, the received training data. The processed training data are then used by the sentiment feature model training unit 902 to train, at step 1015, and obtain the sentiment feature models 903. Such derived models may then be saved, at step 1020, so that they may be used in operation to extract sentiment features from received content items.

Referring back to FIG. 9, the sentiment based bias determiner 415 includes a feature extractor 910, a sentiment feature extractor 915, a source-topic-sentiment generator 920, and a sentiment based bias analyzer 930. By one embodiment, the sentiment based bias determiner 415 receives as input, the content items stored (along with their respective one or more topics) in a content database 630 and the source-topic archive 625 from the topic based bias determiner 410. The feature extractor 910 extracts, in accordance with a contextual feature model 925, one or more contextual features from each content item. The extracted contextual features from the content item enable determining a context of the content included in the content item. The sentiment feature extractor utilizes a trained sentiment feature model 903 to extract sentiment features from the content item. By one embodiment, sentiment features are extracted with respect to a context of the information included in the content item. The extracted sentiment features are sent to the source-topic-sentiment generator 920.

Figure 11:
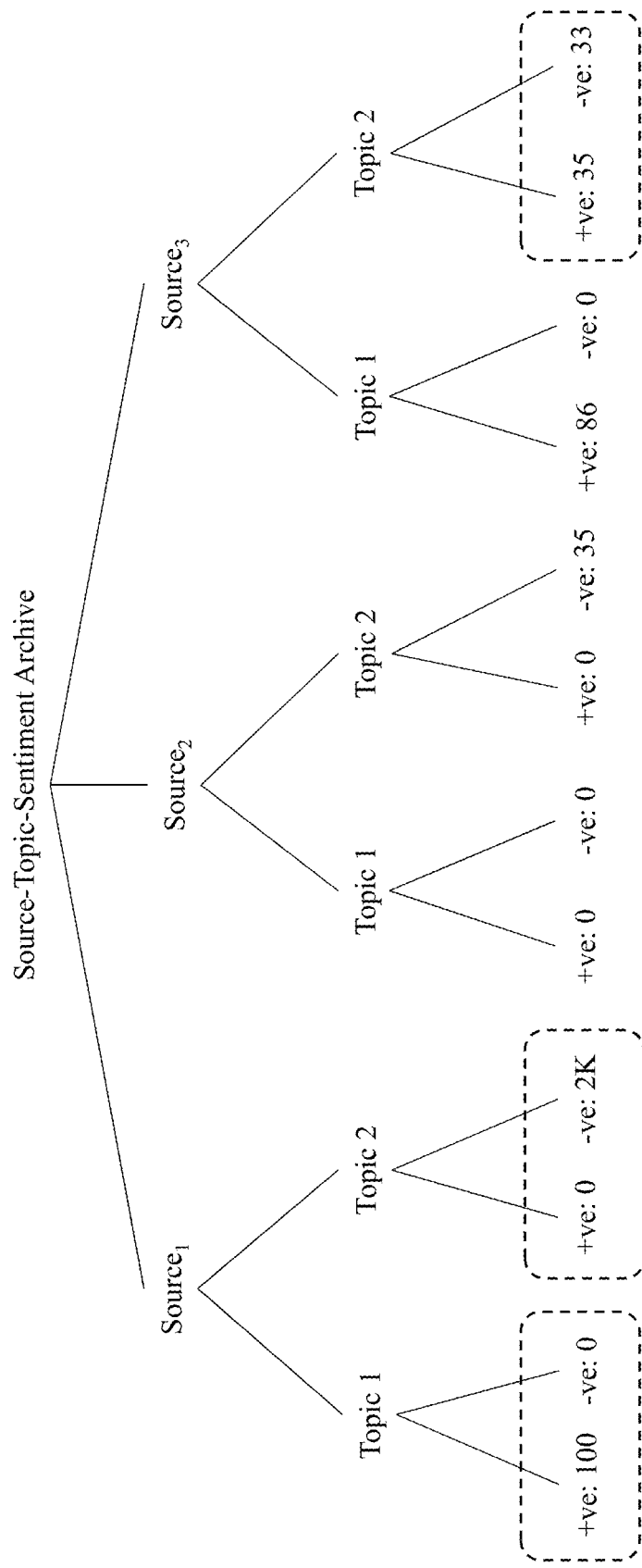
FIG. 11 is a schematic illustrating a source-topic-sentiment archive used for determining sentiment based bias of a plurality of sources, according to an embodiment of the present teaching.

The source-topic-sentiment generator 920 determines whether the extracted sentiment features are one of positive sentiments or negative sentiments. Further, the source-topic sentiment generator 920 receives the source-topic archive 625 (generated by the topic based bias determiner) and updates the source-topic archive 625 with information pertaining to the determined sentiments of content items. For example, by one embodiment, the source-topic sentiment generator 920 aggregates all the content items of a particular topic published by a certain source and determines a distribution of the sentiments (positive or negative) among the content items. In this manner, the source-topic sentiment generator 920 generates a source-topic-sentiment archive 935. An exemplary source-topic sentiment archive 935 is illustrated in FIG. 11.

Upon generating the source-topic-sentiment archive 935, the sentiment based bias analyzer 930 determines, in accordance with a sentiment analysis model 940, a sentiment based bias of each source with respect to publishing content based on the generated source-topic-sentiment archive 935. Details pertaining to the different mechanisms utilized by the sentiment based bias analyzer 930 in identifying whether a particular source has a positive sentiment bias, a negative sentiment bias, or a neutral sentiment bias with respect to publishing content of a certain topic are described later with reference to FIG. 11. Further, the sentiment based bias analyzer 930 stores the identified sentiment based biases for the plurality of sources along with the generated source-topic-sentiment archive 935 in a sentiment bias information database 950.

FIG. 10B depicts a flowchart of an exemplary process performed by a sentiment based bias determiner 415, according to some embodiments of the present teaching. The process commences in step 1030 wherein the sentiment based bias determiner receives content items that are to be analyzed. In step 1035, contextual features are extracted from each content item. In step 1040, sentiment features are extracted from each content item in accordance with a trained sentiment feature model.

The process then moves to step 1045, wherein the sentiment based bias determiner 415 generates source-topic-sentiment archive based on the extracted sentiment features. Further, in step 1050, the sentiment based bias determiner 415 determines, for each source, a sentiment based bias based on an analysis model. The determined sentiment based bias information is stored in a sentiment bias database in step 1055.

FIG. 11 is a schematic illustrating a source-topic-sentiment archive used for determining sentiment based bias of a plurality of sources, according to an embodiment of the present teaching. For sake of simplicity, FIG. 11 illustrates the source-topic-sentiment archive for three sources (Source$_1$, Source$_2$, and Source$_3$) and two topics (Topic$_1$ and Topic$_2$). As shown in FIG. 11, Source$_1$ publishes 100 content items of Topic$_1$ and 2000 content items of Topic$_2$, whereas Source$_2$ publishes 35 content items of Topic$_2$ and Source$_3$ publishes 100 content items of Topic$_1$ and 2000 content items of Topic$_2$.

With regard to Source$_1$, it can be observed that it publishes all 100 content items of Topic$_1$ with a positive sentiment (and no content items with a negative sentiment) and publishes all 2000 content item of Topic$_2$ with a negative sentiment (no content items with a positive sentiment). It must be appreciated that the sentiment based bias determiner of the present teaching determines that Source$_1$ publishes all content items of Topic1 in a positive sentiment by extracting sentiment features from each one of the hundred content items and determining that each of the hundred content items includes positive sentiment features.

In this manner, the sentiment based bias determiner identifies Source1 as having a bias (i.e., positive sentiment bias) with respect to content items of Topic1. In a similar manner, the sentiment based bias determiner identifies Source$_1$ as having a bias with respect to content items of Topic$_2$ (i.e., a negative sentiment bias), as it publishes all content items of Topic$_2$ in a negative manner. Similarly, Source$_2$ can be identified as having a bias with respect to Topic$_2$ (i.e., a negative sentiment bias) and Source$_3$ can be identified as having a positive bias with respect to content items of Topic$_1$.

However, with regard to Topic$_2$, it can be observed that the Source$_3$ publishes 35 content items having a positive sentiment and 33 content items having a negative sentiment. Accordingly, the sentiment based bias determiner identifies Source$_3$ as having a neutral bias with respect to Topic$_2$ as it publishes substantially similar number of content items having a positive and negative sentiments. By one embodiment, the sentiment based bias determiner may compute a difference between a number of content items published with positive sentiments and a number of content items published with negative sentiments. Based on the difference being less than a predetermined threshold value, the sentiment based bias determiner may identify the source as having a neutral bias with respect to the corresponding topic. In contrast, if the computed difference is greater than the predetermined threshold value, the sentiment based bias determiner may identify the source as having one of a positive sentiment (i.e., if the number of content items published with positive sentiments being greater than those published with negative sentiments) and negative sentiment (i.e., if the number of content items published with negative sentiments being greater than those published with positive sentiments).

Figure 12:
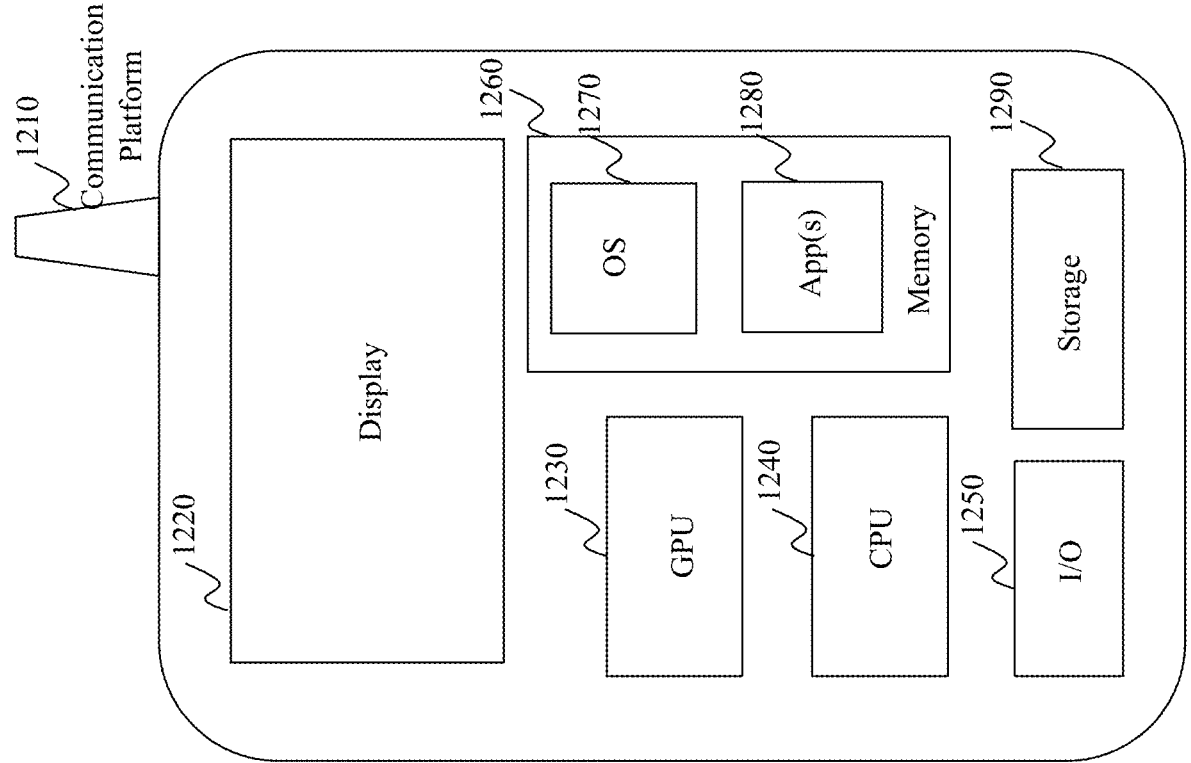
FIG. 12 depicts an architecture of a mobile device which can be used to implement a specialized system incorporating the present teaching.

Turning now to FIG. 12, there is depicted an architecture of a mobile device 1200, which can be used to realize a specialized system implementing the present teaching. In this example, a user device on which the functionalities of the various embodiments described herein can be implemented is a mobile device 1200, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1200 in this example includes one or more central processing units (CPUs) 1240, one or more graphic processing units (GPUs) 1230, a display 1220, a memory 1260, a communication platform 1210, such as a wireless communication module, storage 1290, and one or more input/output (I/O) devices 1250. Any other suitable component, including but not limited to a system bus or a controller (not shown), may also be included in the mobile device 1200. As shown in FIG. 12, a mobile operating system 1270, e.g., iOS, Android, Windows Phone, etc., and one or more applications 1280 may be loaded into the memory 1260 from the storage 1290 in order to be executed by the CPU 1240. The applications 1280 may include a browser or any other suitable mobile apps for performing the various functionalities on the mobile device 1200. User interactions with the content displayed on the display panel 1220 may be achieved via the I/O devices 1250.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 13:
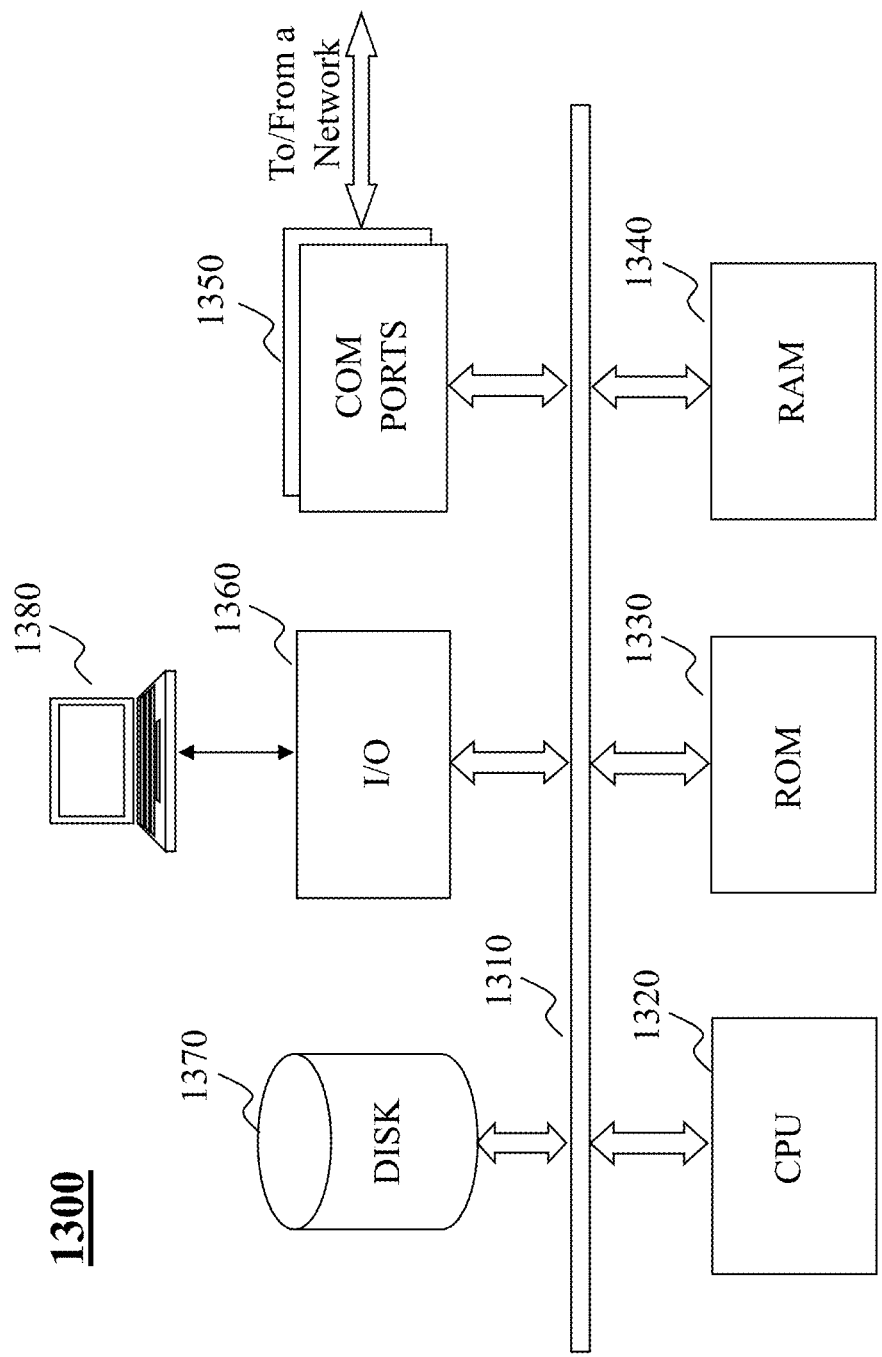
FIG. 13 depicts the architecture of a computer which can be used to implement a specialized system incorporating the present teaching.

FIG. 13 is an illustrative diagram of an exemplary computer system architecture, in accordance with various embodiments of the present teaching. Such a specialized system incorporating the present teaching has a functional block diagram illustration of a hardware platform which includes user interface elements. Computer 1300 may be a general-purpose computer or a special purpose computer. Both can be used to implement a specialized system for the present teaching. Computer 1300 may be used to implement any component(s) described herein. For example, the present teaching may be implemented on a computer such as computer 1300 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1300, for example, may include communication ports 1350 connected to and from a network connected thereto to facilitate data communications. Computer 1300 also includes a central processing unit (CPU) 1320, in the form of one or more processors, for executing program instructions. The exemplary computer platform may also include an internal communication bus 1310, program storage and data storage of different forms (e.g., disk 1370, read only memory (ROM) 1330, or random access memory (RAM) 1340), for various data files to be processed and/or communicated by computer 1300, as well as possibly program instructions to be executed by CPU 1320. Computer 1300 may also include an I/O component 1360 supporting input/output flows between the computer and other components therein such as user interface elements 1380. Computer 1300 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the bias determining engine into the hardware platform(s) of a computing environment or other system implementing a computing environment or similar functionalities in connection with bias determination. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the bias determining engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for providing content, the method comprising:

obtaining a plurality of content items and publication information associated with each of the plurality of content items;

determining one or more topics of each of the plurality of content items;

analyzing the publication information associated with each of the plurality of content items to identify at least one source of a plurality of sources that published the content item;

determining, with respect to each of the plurality of sources, sentiment features of content items published by the source, wherein the sentiment features are determined in accordance with a sentiment feature model derived via machine learning on training data;

generating a source-topic archive storing information indicative of a bias of each of the plurality of sources publishing content based on sentiment features of the published content, wherein the source-topic archive comprises, with respect to each of the one or more topics and each of the plurality of sources:

a first quantity of one or more of the plurality of content items published by the source on the topic with a positive sentiment, and an associated first sentiment indicator indicative of the positive sentiment, and a second quantity of one or more of the plurality of content items published by the source on the topic with a negative sentiment, and an associated second sentiment indicator indicative of the negative sentiment;

in response to a search query from a user for a query content item of the plurality of content items on a query topic published by a first source of the plurality of sources, identifying, based on the first quantity and the second quantity associated with the query topic of the query content item associated with the first source, a bias of the first source with respect to the query topic; and providing the user with information indicative of the bias of the first source.

2. The method of claim 1, wherein the bias of the first source is a coverage bias with respect to the query topic, the coverage bias being determined based on a first number of content items of the query topic published by the first source.

3. The method of claim 2, wherein the first source is determined to have the coverage bias with respect to the query topic based on the first number of content items of the query topic published by the first source being zero.

4. The method of claim 2, wherein the first source is determined to have the coverage bias with respect to the query topic based on a difference between the first number of content items of the query topic published by the first source and a second number of content items of the query topic published by other of the plurality of sources being greater than a predetermined threshold.

5. The method of claim 1, wherein the bias of the first source is a sentiment bias with respect to the query topic, the sentiment bias corresponding to a manner in which content items of the query topic are published by the first source.

6. The method of claim 5, further comprising:
obtaining the content items associated with the query topic that are published by the first source;
extracting, in accordance with the sentiment feature model, one or more sentiment features from each of the content items; and
determining the sentiment bias based on the extracted one or more sentiment features from the content items.

7. The method of claim 5, wherein the sentiment bias is one of a positive sentiment, a negative sentiment, and a neutral sentiment.

8. A machine readable and non-transitory medium having information recorded thereon for providing content, wherein the information, when read by the machine, causes the machine to perform:
obtaining a plurality of content items and publication information associated with each of the plurality of content items;
determining one or more topics of each of the plurality of content items;
analyzing the publication information associated with each of the plurality of content items to identify at least one source of a plurality of sources that published the content item;
determining, with respect to each of the plurality of sources, sentiment features of content items published by the source, wherein the sentiment features are determined in accordance with a sentiment feature model derived via machine learning on training data;
generating a source-topic archive storing information indicative of a bias of each of the plurality of sources publishing content based on sentiment features of the published content, wherein the source-topic archive comprises, with respect to each of the one or more topics and each of the plurality of sources:
a first quantity of one or more of the plurality of content items published by the source on the topic with a positive sentiment, and an associated first sentiment indicator indicative of the positive sentiment, and
a second quantity of one or more of the plurality of content items published by the source on the topic with a negative sentiment, and an associated second sentiment indicator indicative of the negative sentiment;

in response to a search query from a user for a query content item of the plurality of content items on a query topic published by a first source of the plurality of sources, identifying, based on the first quantity and the second quantity associated with the query topic of the query content item associated with the first source, a bias of the first source with respect to the query topic; and providing the user with information indicative of the bias of the first source.

9. The medium of claim 8, wherein the bias of the first source is a coverage bias with respect to the query topic, the coverage bias being determined based on a first number of content items of the query topic published by the first source.

10. The medium of claim 9, wherein the first source is determined to have the coverage bias with respect to the query topic based on the first number of content items of the query topic published by the first source being zero.

11. The medium of claim 9, wherein the first source is determined to have the coverage bias with respect to the query topic based on a difference between the first number of content items of the query topic published by the first source and a second number of content items of the query topic published by other of the plurality of sources being greater than a predetermined threshold.

12. The medium of claim 8, wherein the bias of the first source is a sentiment bias with respect to the query topic, the sentiment bias corresponding to a manner in which content items of the query topic are published by the first source.

13. The medium of claim 12, wherein the information, when read by the machine, further causes the machine to perform:
obtaining the content items associated with the query topic that are published by the first source;
extracting, in accordance with the sentiment feature model, one or more sentiment features from each of the content items; and
determining the sentiment bias based on the extracted one or more sentiment features from the content items.

14. The medium of claim 12, wherein the sentiment bias is one of a positive sentiment, a negative sentiment, and a neutral sentiment.

15. A system for providing content comprising:
a content retrieval unit implemented by a processor and configured for obtaining a plurality of content items and publication information associated with each of the plurality of content items;
a topic determining unit implemented by a processor and configured for determining one or more topics of each of the plurality of content items;
a content processing unit implemented by a processor and configured for analyzing the publication information associated with each of the plurality of content items to identify at least one source of a plurality of sources that published the content item;
a sentiment feature extractor implemented by a processor and configured for determining, with respect to each of the plurality of sources, sentiment features of content items published by the source, wherein the sentiment features are determined in accordance with a sentiment feature model derived via machine learning on training data;
a clustering unit implemented by a processor and configured for generating a source-topic archive storing information indicative of a bias of each of the plurality of sources publishing content based on sentiment features of the published content, wherein the source-topic archive comprises, with respect to each of the one or more topics and each of the plurality of sources:
- a first quantity of one or more of the plurality of content items published by the source on the topic with a positive sentiment, and an associated first sentiment indicator indicative of the positive sentiment, and
- a second quantity of one or more of the plurality of content items published by the source on the topic with a negative sentiment, and an associated second sentiment indicator indicative of the negative sentiment;

a bias determining unit implemented by a processor and configured for in response to a search query from a user for a query content item of the plurality of content items on a query topic published by a first source of the plurality of sources, identifying, based on the first quantity and the second quantity associated with the query topic of the query content item associated with the first source, a bias of the first source with respect to the query topic; and a search engine implemented by a processor and configured for providing the user with information indicative of the bias of the first source.

16. The system of claim 15, wherein the bias of the first source is a coverage bias with respect to the query-a topic, the coverage bias being determined based on a first number of content items of the query topic published by the first source.

17. The system of claim 16, wherein the first source is determined to have the coverage bias with respect to the query topic based on the first number of content items of the query topic published by the first source being zero.

18. The system of claim 16, wherein the first source is determined to have the coverage bias with respect to the query topic based on a difference between the first number of content items of the query topic published by the first source and a second number of content items of the query topic published by other of the plurality of sources being greater than a predetermined threshold.

19. The system of claim 15, wherein the bias of the first source is a sentiment bias with respect to the query topic, the sentiment bias corresponding to a manner in which content items of the query topic are published by the first source.

20. The system of claim 19,
- wherein the content retrieval unit is implemented by a processor and configured for further obtaining the content items associated with the query topic that are published by the first source, and
- wherein the sentiment feature extractor is implemented by a processor and configured for extracting, in accordance with the sentiment feature model, one or more sentiment features from each of the content items; and
- the system further comprising a sentiment based analyzer implemented by a processor and configured for determining the sentiment bias based on the extracted one or more sentiment features from the content items.

21. The system of claim 19, wherein the sentiment bias is one of a positive sentiment, a negative sentiment, and a neutral sentiment.

* * * * *